L. A. SUBERS.
TIRE HAVING A RESERVE OF EXPANSIBILITY.
APPLICATION FILED DEC. 8, 1916.
1,339,868.
Patented May 11, 1920.
2 SHEETS—SHEET 1.
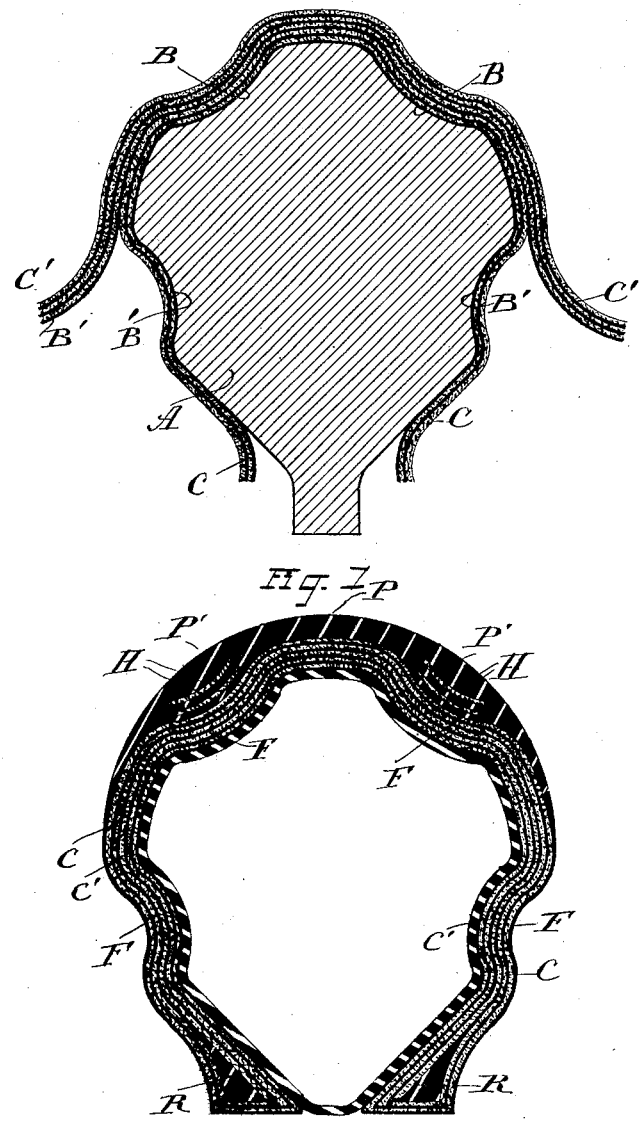

L. A. SUBERS.
TIRE HAVING A RESERVE OF EXPANSIBILITY.
APPLICATION FILED DEC. 8, 1916.
1,339,868.
Patented May 11, 1920.
2 SHEETS—SHEET 2.
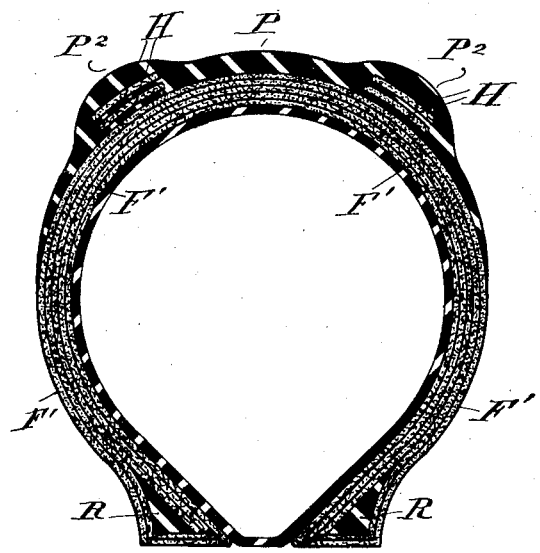
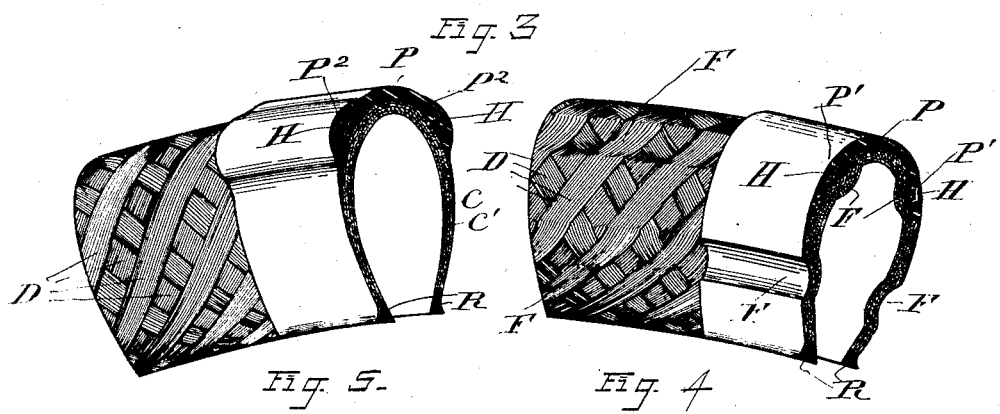
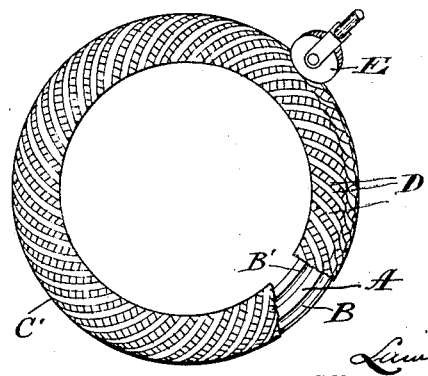

UNITED STATES PATENT OFFICE.

LAWRENCE A. SUBERS, OF LAKEWOOD, OHIO.

TIRE HAVING A RESERVE OF EXPANSIBILITY.

1,339,868.  Specification of Letters Patent.  Patented May 11, 1920.

Application filed December 8, 1916. Serial No. 135,801.

*To all whom it may concern:*

Be it known that I, LAWRENCE A. SUBERS, a citizen of the United States, and resident of Lakewood, in the county of Cuyahoga and State of Ohio, have invented certain new and useful Improvements in Tires Having a Reserve of Expansibility, of which I hereby declare the following to be a full, clear, and exact description, such as will enable others skilled in the art to which it appertains to make and use the same.

The objects of the invention are to provide a tire or casing and method of constructing the same, whereby a tire of normal size will be possessed of an added or reserved capability of expansion, and an increased amount of resiliency, whereby it will endure road shocks of greater severity and is made more durable than other tires of similar size.

The objects are also to provide a pneumatic tire or casing, composed of sheets or layers of fabric and having circumferential grooves or flutes, or inwardly depressed portions therein which by this means is possessed of greater capability of expansion and is of greater resiliency, than a tubular tire or casing formed of tubular fabric, of woven duck or cord in the usual manner in the ordinary smooth circular form.

This tire or casing is preferably constructed from the laminated, cohering, interwound, fabric bands described in my previous Letters Patent, granted and pending, (Letters Patent of the United States No. 1,017,271, dated February 13, 1912; No. 1,132,634, dated March 23, 1915; No. 1,021,014, dated March 26, 1912; No. 1,187,564, dated June 20, 1916; No. 1,233,420, dated July 17, 1917; and No. 1,230,338, dated June 19, 1917,) in which the bands are composed of fibrous yarn elements laminated and diagonally laid in crossing series of parallel bands, coated with adhesive and vulcanizable material.

To obtain the requisite extensibility in such a fabric, a core is made, provided with annular circumferential grooves of predetermined size and shape in cross section, cut in its outer face and sides. The fabric sheets or layers are then molded over the core and pressed into the grooves so that when vulcanized the form of the grooves is permanently impressed therein.

Similar grooves are preferably formed in this manner on the outer tread face and sides of the tire and casing and the edges of the fabric are shaped around the annular beads at the rim side.

The total calculated width of such a fabric is increased in this manner upon the contour line of a cross section of the tire, and a corresponding increase in the length of each band is obtained since the bands are laid preferably at an angle of 45° to the edge of the fabric and are also molded into the grooves.

When a tire or casing thus constructed is inflated the inwardly depressed annular flutes are forced outward by the internal pressure until the contour of the cross section of the tire is circular and the fabric having more material in the fluted portions than elsewhere is compressed in the fluted and normal portions.

In this manner the fluted portions are brought into the circumferential contour of the normal portions which have expanded in diameter under the pressure only the amount that a normal tire would expand under the same amount of pressure.

In this manner the actual length of the circumference of the tire is not increased under normal pressure, but being compressed in the fluted zones or portions the tire is capable of greater subsequent extensibility and resiliency when in use, than a tire constructed of layers of duck fabric or combinations of cord structures.

The advantages of this method of construction of a tire are very great and particularly so when used on rough roads, since it is more durable and is capable of resisting more severe shocks before the ultimate bursting limit is reached. Also the subsequent expansion being distributed over the sides and tread surfaces the rim edges are relieved from excessive strain or stress thereon.

The invention is hereinafter further described, shown in the accompanying drawings and specifically pointed out in the claims.

In the accompanying drawings Figure 1 is a transverse section of the core over which the casing is molded showing the circumferential flutes or depressions therein; Fig. 2 is a transverse section of a completed casing molded thereon with the annular beads at the rim side inserted; Fig. 3 is a similar view showing the effect of inflation of the tire to bring the depressed portions into the normal circumference of the casings; Fig. 4 is a perspective of a portion of a casing showing the annular depressed portions and the diagonally laid crossing rows of fibrous bands therein; Fig. 5 is a similar view showing the effect of inflation of the casing to elevate the depressions into the level of the normal circumference of the tire; Fig. 6 is a side elevation of the core showing the method of rolling the fabric sheets into the annular depressions in the core.

In these views A is the core having annular grooves or depressions B, B' cut in its periphery. Two of these B, B, are cut in the outer or tread face and one B' is cut in each side thereof. C, C' are layers of fabric composed of crossing series of parallel bands D, of yarn elements, laid diagonally at an angle of 45° and one layer crossing the other at the same angle.

The layers, while perfectly flat, are molded over the core A and by means of a roller E or other convenient method are pressed into the grooves B, B' in the outer face and sides of the core as shown in Fig. 6.

It will be seen that a greater width of fabric will be required to cover the periphery of the grooved core than if the core were free from recesses of any kind.

It is also obvious that each band diagonally extending over the core and pressed at intervals into the grooves B and B' will be longer than when molded over a perfectly smooth cylindrical or annular surface.

Hence the amount of material in this tire of standard diameter will be greater than in an ordinary standard tire of the same size.

When this tire is inflated the depressed portions F, F, therein will be forced outwardly until they coincide with the circumferential contour of the casing, as shown at F', F', Fig. 3, a certain amount of compression of the fabric taking place in the zones F', F' represented by the recessed portions.

The compressed portions are therefore capable of a greater amount of subsequent expansion and are therefore more resilient under pressure and sudden shock than the normally shaped portions of the casing, and provide elements of safety therefor by means of which the ultimate strain required to destroy or burst the tire must be much greater than in a normally constructed tire.

A valuable result of this action of the tire is that annular portions of the tread surface P will be raised at the time that the fluted portions are raised, and hence will form ridges or nonskid annular projections on the tread surface. The tread member P is vulcanized to the grooved fabric, leaving the exterior surface perfectly smooth at P', and after inflation, and after the annular recesses are filled outwardly the corresponding annular surfaces of the tread member P will project at P² thus forming annular rings upon the tread.

The inner edges of the casing are reinforced with the annular beads R, R by folding the edges over them in the usual manner.

At H, H, are shown additional annular strips of fabric arranged in the tread member and concentric with the fluted portions; these strips move outward as shown in Fig. 5 when the tire is inflated and form reinforcing means for the ribs produced on the exterior of the tire, and strengthen them for their use as non-skid members.

Having described the invention, what I claim as new and desire to secure by Letters Patent is:—

1. A pneumatic tire or casing, comprising a body of normal diameter formed of laminated cohering series of diagonally laid parallel bands of yarn elements, said body having annular depressed zones or grooves formed in the bands, and a tread layer of normal diameter secured thereto and inclosing said annular depressed zones, and annular reinforcing fabric strips embedded in said tread layers and overlying said annular depressed portions.

2. In a casing for a pneumatic tire, a body of normal diameter formed of crossed laminations of parallel cohering interwound fibrous bands, inclined to the sides of said casing, said body provided with annular depressed zones of integral fabric, a tread member secured to said body portion, fabric reinforcement embedded in said tread member, and overlaying said depressed portions, said depressed portions extending outwardly to complete the circular contour of said casing when the tire is inflated, the tread member over said depressions expanding to form circumferential ridges thereon.

In testimony whereof I hereunto set my hand this 4th day of December, 1916.

LAWRENCE A. SUBERS.

In presence of—
 S. L. EFLINE,
 A. T. OSBORN.